Patented May 3, 1938

2,115,735

UNITED STATES PATENT OFFICE 2,115,735

PRETREATMENT OF CELLULOSE PREPARATORY TO ACYLATION

Carl J. Malm, Rochester, N. Y., assignor, by mesne assignments, to Eastman Kodak Company, Jersey City, N. J., a corporation of New Jersey No Drawing. Application March 28, 1931, Serial No. 526,121

15 Claims. (Cl. 260—101)

My invention relates to the pretreatment of cellulose with a mixture of acetic and sulfuric acids under chemically anhydrous conditions. The dehydration of the materials used is accomplished by the addition of the theoretical amount of acetic anhydride necessary to take up chemically the water that may be present in the pretreatment bath.

In some processes of acetylating cellulose it has been advocated to leave the cellulose in contact with the acetic acid and sulfuric acid for several hours, without any destruction of the uncombined water present, before the acylating agent such as acetic anhydride is added. In that case the longer the cellulose has been in contact with the acetic and sulfuric acids before the addition of acetic anhydride, the quicker and more energetic will be the reaction, the more difficult to control, and the greater liability of weakening the strength of the acetate, probably due to overheating at this point of the acylation with formation of hydrocellulose. These difficulties are increased in proportion to the moisture present in the pretreatment bath. For instance, allowing the cellulose and the acetic and sulfuric acids to remain at room temperature, with even only a few percent of moisture present in the bath, would with the addition of cold acetic anhydride thereto produce such a rapid reaction that it would be difficult to control and an inferior and weak acetate would result. To produce esters of predetermined solubilities and maximum strength in film form, it is necessary that the several steps of the process be accomplished gradually and be under complete control at all times.

In some processes the pretreatment bath has been rendered anhydrous because acetic anhydride is present in sufficient amount to dehydrate the mass. However, the acetic anhydride in that case is also present in an amount large enough to perform a partial acetylation causing the cellulose to lose its texture. The mass remaining after this pretreatment has present numerous doughy clusters of uncombined cellulose except in their outer layer, this being a coating of cellulose acetate. When the mass resulting from the foregoing pretreatment is acetylated, the strength of the acetylating fluid is diminished by combination with cellulose present so that it becomes almost impossible to bring the cellulose from these doughy partially-unacted-upon lumps into solution, the tendency being to form translucent lumps in the reaction mixture prior to hydrolysis. This necessitates the filtering of the reaction mixture before hydrolysis if a uniform final product is desired therefrom which adds to the difficulty of the operation. I have found that by my process this lumping may be eliminated without the necessity of various corrective steps such as filtering etc. and that a uniform product free from lumps, haze and blurbs is produced.

I have found that by my pretreatment in which moisture is eliminated the time and temperature of the acetylation may be regulated with surprising precision. It is known that when moisture is present the heat of reaction is higher and the danger of degrading of the cellulose is greater especially when sulfuric acid is used as the catalyst. This makes necessary artificial cooling in order to regulate the reaction to obtain the particular product desired as to viscosity and various other physical properties. Also where moisture is present in the mixture stirring is necessary to prevent localized acetylation and obtain a uniform product. By my process these various technical operations are of less importance, danger from error in regulation is reduced to a minimum and a uniform cellulose acetate of predetermined physical properties is obtained.

My pretreatment step consists in adding to cellulose a mixture of glacial acetic acid and sulfuric acid together with the amount of acetic anhydride necessary to chemically combine with any uncombined water which is present in the cellulose, the acetic acid and the sulfuric acid and allowing the mass to stand for at least 1–4 hours or even more at about 75°–100° F. The resulting mass contains substantially 100% acetic acid and the batch is made anhydrous by this procedure. There may also possibly be a small fraction of a percent of acetic anhydride present but the amount present is so small that it exerts no effect whatever and is present in this very slight excess only to assure that the mass is completely anhydrous. This mass is then cooled to about 65°–75° F. and the acetylation is then carried out in the usual manner, such as by adding the required amount of acetic anhydride. The amount of catalyst added in the pretreatment may be the amount of catalyst which is necessary in the acetylation.

The following examples are illustrative of the specific embodiment of my invention:

500 lbs. of pre-dried cotton linters of 1½% moisture content were treated with

| | Pounds |
|---|---|
| 85% acetic anhydride | 186 |
| 99.5% acetic acid | 4000 |
| 95% $H_2SO_4$ (sp. gr. 1.84) | 10 | and the mass was allowed to remain (preferably with stirring) at about 80–90° F. for 2 hours. The linters retained their texture and when they were washed with water and dried they were found to have the same appearance and texture as the original linters.

The pretreated mass was then cooled to about 65° F. and it was then acetylated by adding 1300 lbs. acetic anhydride and allowing the temperature to rise over a period of 3–4 hours up to 100° F. Any known methods of acetylation may be employed.

In practice, the operator may, as above adverted to, add a few pounds more anhydride in the pretreatment than that needed theoretically to dehydrate the mass, to compensate for any possible loss such as evaporation, leakage, etc., so as to assure actual anhydrous conditions. However, for the reasons previously pointed out, no more acetylation must take place in the pretreatment bath than if acetic acid without any anhydride were used in the pretreatment even at the price of having a minute fraction of a percent of moisture present in the bath, it being understood that the spirit of the invention is to substantially completely dehydrate the cellulose by means of acetic anhydride and to have substantially no acetic anhydride remaining after the completion of such dehydration.

If the cotton linters contain 2% of moisture, the amount of 85% acetic anhydride necessary in the above example is about 203 lbs. with the proportions of other ingredients as given. If cotton linters are used which contain as much as 5% moisture (which they ordinarily do when not oven dried) about 303 lbs. of 85% acetic anhydride is necessary with the proportions of ingredients given in the example to assure anhydrous conditions. It will be obvious that for different strength of acetic acid or anhydride that the amount of anhydride necessary will vary correspondingly. However, it is preferred to employ the foregoing strengths of materials and that the cellulose be dried to about 1–2% moisture content before adding the pretreating mixture to it.

If desired other fatty acid anhydrides than acetic, such as propionic and butyric or mixtures of these alone or with acetic anhydride may be used if desired. For example, if the same proportions and strengths of the other ingredients than the anhydride are used, as given in the example in which the cotton contains 1½% moisture, 237 lbs. of propionic anhydride (85%) may be used instead of the acetic anhydride. Under the same conditions with the cotton containing 5% of moisture it will be necessary to use about 386 lbs. of propionic anhydride (85%) to assure anhydrous conditions. For example, the propionic anhydride forms propionic acid which, upon being present in the subsequent acylation with acetic anhydride in the presence of acetic acid, forms a mixed ester (acetate-propionate) of cellulose. My pretreatment is adaptable to practically all of the common acylations known at the present time.

In my pretreatment, if desired, other anhydrous fatty acids than glacial acetic acid may be employed in the process. For example, propionic acid of a substantially anhydrous nature may entirely replace the glacial acetic acid or may replace the acetic acid only partially. As is well known when acetic acid is present in an acylation bath, acetyl groups may attach to the cellulose molecule and when this acetylation is to be avoided it will be obvious that some other acid should be used.

After the acetylation has taken place, the cellulose acetate may be removed from the reaction mass by precipitating with water or the cellulose acetate may be hydrolized in any well known manner to the point of any preferred solubility and then precipitated.

It is understood that other acetylating agents may be used for acetylating the cellulose after my pretreatment, such as acetyl chloride, etc., the choice of acetylation step proper being optional with the individual.

Also my pretreatment may be used in combination with various acylation processes in which acyl groups of more than two carbon atoms may be attached to the cellulose. For example, if a cellulose acetate-propionate is desired either the pretreatment bath may contain propionic acid and the acylation be carried out by using acetic anhydride as an impeller which also contributes acetyl groups, or the pretreatment may be carried out as described in the example, and propionic anhydride or propionyl chloride may be used in the acylation step. If cellulose propionate is desired the pretreatment and acylation may be carried out with only propionyl containing fatty acid compounds present. If cellulose acetate-stearate is desired, the pretreatment may be carried out as described in the example and the acylation may be carried out, for example, with stearic acid and chloracetic or alkoxy acetic anhydride as disclosed in Clarke and Malm application No. 520,150. Other acylation processes in which my pretreatment step may be used are those disclosed in United States Clarke and Malm Patent No. 1,735,159.

Also other acetylation catalysts than sulfuric acid (which are now commonly known) may be used in the pretreatment instead of the sulfuric acid if desired. However, sulfuric acid is at present the most suitable catalyst to be used in this connection for economic reasons.

What I claim as my invention and desire to secure by Letters Patent of the United States is:

1. A process of preparing cellulose for acylation which comprises treating cellulose with a bath comprising a lower fatty acid and a lower fatty acid anhydride in the ratio of approximately one molecular proportion of anhydride (calculated as full strength) for each molecular proportion of water which is present in the cellulose and in the said bath.

2. A process of preparing cellulose for acylation which comprises treating cellulose with a bath comprising acetic acid and a lower fatty acid anhydride in the ratio of approximately one molecular proportion of anhydride (calculated as full strength) for each molecular proportion of water which is present in the cellulose and in the said bath.

3. A process of preparing cellulose for acylation which comprises treating cellulose with a bath comprising acetic acid and acetic anhydride in the ratio of approximately one molecular proportion of anhydride (calculated as full strength) for each molecular proportion of water which is present in the cellulose and in the said bath.

4. A process of preparing cellulose for acylation which comprises treating cellulose with a bath comprising a lower fatty acid, an acylation catalyst and a lower fatty acid anhydride in the ratio of approximately one molecular proportion of anhydride (calculated as full strength) for each molecular proportion of water which is present in the cellulose and in the said bath.

5. A process of preparing cellulose for acylation which comprises treating cellulose with a bath comprising a lower fatty acid, sulfuric acid and a lower fatty acid anhydride in the ratio of approximately one molecular proportion of anhydride (calculated as full strength) for each molecular proportion of water which is present in the cellulose and in the said bath.

6. A process of preparing cellulose of approximately 1–2% moisture content for acylation which comprises treating 500 parts of the cellulose with about 4000 parts of acetic acid (99.5%) and 10 parts of sulfuric acid (95%) in the presence of approximately 186 parts acetic anhydride (85%).

7. Method of pretreating cellulose to be esterified comprising treating the same with an anhydride of a lower fatty acid in the presence of a catalyst promoting the combination of the anhydride with water under such conditions that no esterification of the cellulose takes place.

8. Method of pretreating cellulose to be acetylated comprising treating the same with acetic anhydride in the presence of sulfuric acid as catalyst under such conditions that no acetylation of the cellulose takes place.

9. Method of preparing cellulose acetate comprising pretreating cellulose in the presence of a catalyst promoting the combination of the anhydride with water with acetic anhydride in quantity at the most chemically equivalent to the water contained in the cellulose under such conditions that the cellulose remains in a fibrous condition and then acetylating the so treated cellulose.

10. Method of pretreating cellulose to be esterified comprising treating the same in the presence of a catalyst promoting the combination of the anhydride with water with an anhydride of a lower fatty acid in quantity at the most chemically equivalent to the water contained in the cellulose under such conditions that the cellulose remains in a fibrous condition.

11. Method of pretreating cellulose to be acetylated comprising treating the same in the presence of a catalyst promoting the combination of the anhydride with water with acetic anhydride in quantity at the most chemically equivalent to the water contained in the cellulose under such conditions that the cellulose remains in a fibrous condition.

12. Method of pretreating cellulose to be esterified, comprising treating the same with an anhydride of a lower fatty acid in quantity at the most chemically equivalent to the water contained in the cellulose, in the presence of a catalyst which promotes the combination of the anhydride with water.

13. Method of pretreating cellulose to be esterified, comprising treating the same with acetic anhydride in quantity at the most chemically equivalent to the water contained in the cellulose, in the presence of a catalyst which promotes the combination of the anhydride with water.

14. A process of preparing cellulose for acylation which comprises treating it with a bath comprising propionic acid and a lower fatty acid anhydride in the ratio of approximately one molecular proportion of anhydride (calculated as full strength) for each molecular proportion of water which is present in the cellulose and in the said bath.

15. A process of preparing cellulose for acylation which comprises treating it with a bath comprising propionic acid and propionic acid anhydride in the ratio of approximately one molecular proportion of anhydride (calculated as full strength) for each molecular proportion of water which is present in the cellulose and in the said bath.

CARL J. MALM.